US010175880B2

(12) United States Patent
Phang et al.

(10) Patent No.: US 10,175,880 B2
(45) Date of Patent: Jan. 8, 2019

(54) DISPLAY APPARATUS AND DISPLAYING METHOD THEREOF

(71) Applicant: SAMSUNG ELECTRONICS CO., LTD., Suwon-si, Gyeonggi-do (KR)

(72) Inventors: Joon-ho Phang, Seoul (KR); Na-young Koh, Seoul (KR); Jean-Christophe Naour, Anyang-si (KR); Kwan-min Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 329 days.

(21) Appl. No.: 15/011,974

(22) Filed: Feb. 1, 2016

(65) Prior Publication Data
US 2016/0224233 A1 Aug. 4, 2016

(30) Foreign Application Priority Data

Feb. 2, 2015 (KR) ........................ 10-2015-0016262

(51) Int. Cl.
*G06F 3/0488* (2013.01)
*G06F 3/0482* (2013.01)
(Continued)

(52) U.S. Cl.
CPC ...... *G06F 3/04883* (2013.01); *G06F 3/03547* (2013.01); *G06F 3/0482* (2013.01);
(Continued)

(58) Field of Classification Search
CPC ............. G06F 3/04883; G06F 3/03547; G06F 3/0485; G06F 3/0482; H04N 21/47217;
(Continued)

(56) References Cited

U.S. PATENT DOCUMENTS 9,389,718 B1\* 7/2016 Letourneur ........... G06F 3/0412
2006/0294476 A1\* 12/2006 Buckley ................ G06F 3/0482
715/781
(Continued)

FOREIGN PATENT DOCUMENTS

JP 2009-207177 9/2009

OTHER PUBLICATIONS

Kelly, Gordon, "Apple Patents a New Shape for Headphone Jack That Will Anger Everyone", *Forbes*, Sep. 23, 2015, <http://www.forbes.com/sites/gordonkelly/2015/09/23/apple-cuts-headphone-jack/>, accessed Feb. 1, 2016.

(Continued)

*Primary Examiner* — Jeffrey A Gaffin
*Assistant Examiner* — Ayesha E Huertas Torres
(74) *Attorney, Agent, or Firm* — Staas & Halsey LLP

(57) ABSTRACT

A display apparatus and a displaying method thereof are provided, where the display apparatus includes: a display unit configured to display contents and user interfaces (UIs); an input unit configured to receive a user command; and a controlling unit configured to control the display unit so that a first UI is displayed on one region of the display unit in the case in which a first touch is input through the input unit while the contents are displayed and the first UI is changed to a second UI to be indicated in the case in which a second touch having larger pressure than the first touch is input through the input unit while the first UI is displayed.

19 Claims, 26 Drawing Sheets

(51) Int. Cl.

| | |
|---|---|
| *G06F 3/0485* | (2013.01) |
| *H04N 21/443* | (2011.01) |
| *H04N 21/422* | (2011.01) |
| *H04N 21/482* | (2011.01) |
| *H04N 21/472* | (2011.01) |
| *G06F 3/0354* | (2013.01) |

(52) U.S. Cl.
CPC ..... *G06F 3/0485* (2013.01); *H04N 21/42224* (2013.01); *H04N 21/4438* (2013.01); *H04N 21/47217* (2013.01); *H04N 21/4828* (2013.01)

(58) Field of Classification Search
CPC ........... H04N 21/4828; H04N 21/4438; H04N 21/42224
See application file for complete search history.

(56) References Cited

U.S. PATENT DOCUMENTS

2011/0016422 A1\* 1/2011 Miyazawa ............ G06F 3/0488
  715/788
2014/0002390 A1   1/2014 Lee et al.

OTHER PUBLICATIONS

Olson, Parmy, "iPhone 6S Review Round-Up: 3D Touch is Killer Feature", *Forbes*, Sep. 23, 2015, <http://www.forbes.com/sites/parmyolson/2015/09/23/iphone-6s-reviews-3d-touch-killer-feature/>, accessed Feb. 1, 2016.
Stroud, Forrest, "Force Touch", *Webopedia*, <http://www.webopedia.com/TERM/F/force-touch.html>, accessed Feb. 1, 2016.

\* cited by examiner

DISPLAY APPARATUS AND DISPLAYING METHOD THEREOF

CROSS-REFERENCE TO RELATED APPLICATIONS

This application claims priority from Korean Patent Application No. 10-2015-0016262, filed on Feb. 2, 2015, in the Korean Intellectual Property Office, the disclosure of which is incorporated herein by reference in its entirety.

BACKGROUND

1. Field

Apparatuses and methods consistent with the embodiments relate to a display apparatus and a displaying method thereof, and more particularly, to a display apparatus capable of providing a graphic user interface (GUI) allowing a user to easily use and select a plurality of contents, and a displaying method thereof.

2. Description of the Related Art

Recently, a display apparatus is not only used as a means for simply displaying broadcast contents, but also used as a central apparatus of peripheral devices by a connection to a variety of apparatuses and may also watch various contents on a web through an Internet connection. In addition, the display apparatus such as TV has been advanced to a smart TV capable of increasing utilization by installing various applications.

Accordingly, as the number of contents which may be used by the display apparatus, such as contents provided from the display apparatus itself, contents received from an external server, and the like, is increased, an importance of a user interface by which the contents intended to be used by the user may be easily searched and classified has emerged.

That is, as the contents which may be used by the display apparatus are rapidly increased, it is difficult to control the display apparatus by a remote controller simply including channel and volume buttons which are previously used.

In addition, a pointing device which is mainly used for a personal computer (PC) has a relatively large size of a display screen, and the display apparatus such as TV which is mainly controlled at remote is not suitable to use various contents.

Therefore, a solution for allowing the user to easily and instinctively use and select contents or services provided by the display apparatus is requested.

SUMMARY

Additional aspects and/or advantages will be set forth in part in the description which follows and, in part, will be apparent from the description, or may be learned by practice of the embodiments.

Exemplary embodiments overcome the above disadvantages and other disadvantages not described above. Also, the embodiments are not required to overcome the disadvantages described above, and an exemplary embodiment may not overcome any of the problems described above.

The embodiments provide a display apparatus capable of easily classifying and searching contents or services provided from the display apparatus according to an instruction of a user, and a displaying method thereof.

According to an aspect, a display apparatus includes: a display unit configured to display contents and user interfaces (UIs); an input unit configured to receive a user command; and a controlling unit configured to control the display unit so that a first UI is displayed on one region of the display unit in the case in which a first touch is input through the input unit while the contents are displayed and the first UI is changed to a second UI to be indicated in the case in which a second touch having larger pressure than the first touch is input through the input unit while the first UI is displayed.

The first UI may be a UI representing information on the displayed contents, and the second UI may be a UI including a plurality of menus associated with the displayed contents.

The controlling unit may control the display unit so that a highlight is indicated on one menu of the plurality of menus included in the second UI and the highlight is moved and indicated to correspond to an input direction of a scroll instruction in the case in which the scroll instruction is input through the input unit.

The first UI may be a UI including a plurality of menus associated with the displayed contents, and the second UI may be a UI including more menus than the menus included in the first UI by extending the first UI.

The controlling unit may control the display unit so that the second UI is enlarged and menus corresponding to an upper category of the second UI are displayed on the enlarged region in the case in which a third touch having larger pressure than the second touch is input through the input unit, while the second UI is displayed.

The input unit may be implemented as a pointing device, and the controlling unit may perform a control so that a highlight is indicated on one menu of a plurality of menus included in the second UI and the indicated highlight is moved along a motion of the pointing device, and execute a menu on which the highlight is positioned in the case in which the indication of the highlight is not moved more than a threshold time.

The input unit may be implemented as a pointing device, and a controlling unit may perform a control so that the second UI is displayed on left and right edges of the display unit, and controls the display unit so that a UI of a position corresponding to a direction of the pointing device of the second UI is enlarged and displayed while being moved in a central direction of the display unit in the case in which a user manipulation moving the pointing device to one side is input.

The input unit may be implemented as the pointing device, and the controlling unit may control the display unit so that a search box for a search instruction and a letter UI are displayed in the case in which the search instruction is input through the input unit, and perform a control so that a movement speed of a pointer becomes slow while the pointer corresponding to a position of the pointing device passes over the letter UI.

The controlling unit may control the display unit so that a search result is displayed in a form of the first UI or the second UI in the case in which a search word is input through the search box and the letter UI.

The second UI may be visually indicated by highlighting.

According to another aspect, a displaying method of a display apparatus includes: displaying contents; displaying a first user interface (UI) on one region of a display unit in the case in which a first touch is input, while the contents are displayed; and changing the first UI to a second UI and displaying the second UI in the case in which a second touch having larger pressure than the first touch is input while the first UI is displayed.

The first UI may be a UI representing information of the displayed contents, and the second UI may be a UI including a plurality of menus associated with the displayed contents.

The displaying method may further include: indicating a highlight on one menu of the plurality of menus included in the second UI; and moving and indicating the highlight to correspond to an input direction of a scroll instruction in the case in which the scroll instruction is input.

The first UI may be a UI including a plurality of menus associated with the displayed contents, and the second UI may be a UI including more menus than the menus included in the first UI by extending the first UI.

The displaying method may further include: enlarging the second UI and displaying menus corresponding to an upper category of the second UI on the enlarged region in the case in which a third touch having larger pressure than the second touch is input, while the second UI is displayed.

The displaying method may further include: indicating a highlight on one menu of a plurality of menus included in the second UI; and moving the indicated highlight along a motion of the pointing device and executing a menu on which the highlight is positioned in the case in which the indication of the highlight is not moved more than a threshold time.

The displaying method may further include: displaying the second UI on left and right edges of the display unit; and enlarging and displaying a UI of a position corresponding to a direction of the pointing device of the second UI while moving the UI in a central direction of the display unit in the case in which a user manipulation moving the pointing device for controlling the display unit to one side is input.

The displaying method may further include: receiving a search instruction; displaying a search box for the search instruction and a letter UI in the case in which the search instruction is input; and performing a control so that a movement speed of a pointer becomes slow while the pointer corresponding to a position of the pointing device for controlling the display unit passes over the letter UI.

The displaying method may further include: displaying a search result in a form of the first UI or the second UI in the case in which a search word is input through the search box and the letter UI.

According to an aspect, an apparatus includes a display providing a user interface (UI) responsive to a touch pressure command and a computer changing the UI displayed on the display from a first UI to a second UI responsive to a change of touch pressure to a higher pressure between a first touch and a second touch.

The first UI may include content information on displayable contents, and the second UI may include menus corresponding to a content selected from the displayable contents.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
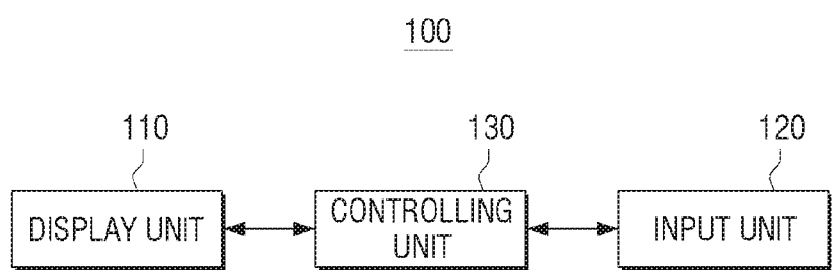
FIG. 1 is a block diagram illustrating a configuration of a display apparatus according to an exemplary embodiment.

Reference will now be made in detail to the embodiments, examples of which are illustrated in the accompanying drawings, wherein like reference numerals refer to the like elements throughout. The embodiments are described below to explain the embodiments by referring to the figures.

Exemplary embodiments may be diversely modified. Accordingly, specific exemplary embodiments are illustrated in the drawings and are described in detail in the detailed description. However, it is to be understood that the present invention is not limited to a specific exemplary embodiment, but includes all modifications, equivalents, and substitutions without departing from the scope and spirit of the embodiments. Also, well-known functions or constructions are not described in detail since they would obscure the embodiments with unnecessary detail.

The terms "first", "second", . . . may be used to describe diverse components, but the components are not limited by the terms. The terms are only used to distinguish one component from the others.

The terms used in the present application are only used to describe the exemplary embodiments, but are not intended to limit the scope of the embodiments. Singular forms used herein are intended to include plural forms unless explicitly indicated otherwise. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

FIG. 1 is a block diagram illustrating a configuration of the display apparatus 100 according to an exemplary embodiment. As illustrated in FIG. 1, the display apparatus 100 may include a display unit 110, an input unit 120, and a controlling unit 130. In this case, the display apparatus 100 may be a TV, but is merely one example. The display apparatus 100 may be implemented as various electronic apparatuses such as a portable phone, a tablet PC, a digital camera, a camcorder, a notebook PC, a PDA, and the like including the display unit 110.

The display unit 110 is a component for displaying an image. The display unit 110 may display contents received through a broadcast channel. That is, the display apparatus 100 may also receive a variety of broadcasting signals transmitted from a broadcasting station through a radio frequency (RF) communication network and may also receive the contents from a variety of servers through an Internet Protocol (IP) network, and the display unit 110 may display the received contents.

In addition, the display unit 110 may display a variety of user interfaces (UIs). For example, the display unit 110 may display a variety of UIs for controlling the display apparatus 100 or controlling the displayed contents, according to an instruction of a user.

Meanwhile, the input unit 120 is a component for receiving a user command, the user command may be in the form of a screen command having a screen initiation location on a display, such a screen finger(s) touch type of input and which may be a 3D or Force Touch type touch which recognizes touch pressure or levels of touch pressure of the touch input or touches of different pressure or touches relative to a pressure threshold. The input unit 120 may receive the user command input at remote. Particularly, the input unit 120 may include a variety of sensors such as a proximity sensor, a touch sensor, a force sensor, and a motion sensor and may be implemented as an apparatus that senses an operation of an approach, a touch, or the like of the user by stages. For example, the input unit 120 may be implemented as a remote controller or may be implemented as a pointing device.

Meanwhile, the controlling unit 130 is a component for controlling an overall operation of the display apparatus 100. Particularly, the controlling unit 130 may control the display unit 110 so that a variety of UIs are displayed according to the user command input through the input unit 120 the controlling unit 130 may be a processor or a computer of the display unit 110.

Specifically, in the case in which a first touch is input through the input unit 120 while the contents are displayed on the display unit 110, the controlling unit 130 may display a first UI on one region of the display unit 110. In addition, in the case in which a second touch having larger pressure than the first touch is input through the input unit 120 while the first UI is displayed, the controlling unit 130 may control the display unit 110 so that the first UI is changed to the second UI and the second UI is indicated or highlighted.

The first UI may be a UI representing information on the displayed contents. In addition, the second UI may be a UI including a plurality of menus associated with the displayed contents.

In this case, the controlling unit 130 may control the display unit 110 so that a highlight is indicated or shown on one menu of the plurality of menus included in the second UI. In addition, in the case in which a scroll instruction is input through the input unit 120, the controlling unit 130 may control the display unit 110 so that the highlight is moved and indicated to correspond to an input direction of the scroll instruction.

For example, if a touch input sensing portion included in the input unit 120 is touched and a user command instructing the scrolling in a right direction is input, the controlling unit 130 may control the display unit 110 so that the indicated highlight is indicated while moving the displayed highlight in a clockwise direction.

Meanwhile, in the case in which a third touch having larger pressure than the second touch is input through the input unit 120 while the second UI is displayed, the controlling unit 130 may control the display unit 110 so that the second UI is enlarged and menus corresponding to an upper category of the second UI are displayed on an enlarged region.

That is, the controlling unit 130 may display the enlarged second UI including both of the menus included in the second UI and the menus corresponding to the upper category of the respective menus before the third touch is input.

On the other hand, the first UI may be a UI including a plurality of menus associated with the displayed contents, and the second UI, which is a form extending the first UI, may also be a UI including more menus than the menus included in the first UI. Detailed forms of the first UI and the second UI will be described below.

Meanwhile, the input unit 120 may be implemented as the pointing device. Therefore, the controlling unit 130 may perform a control so that the highlight is indicated on one menu of the plurality of menus included in the second UI and the indicated highlight is moved along a motion of the pointing device. In addition, in the case in which the indication of the highlight along a position of the pointing device is not moved more than a threshold time, that is, in the case in which the user command moving the pointing device is not input more than the threshold time, the controlling unit 130 may execute the menu on which the highlight is positioned.

In addition, the controlling unit 130 may perform a control so that the second UI is displayed on left and right edges of the display unit 110. In addition, if a user manipulation moving the pointing device to one side is input, the controlling unit 130 may control the display unit 110 so that a UI of a position corresponding to a direction of the pointing device of the second UI is enlarged and displayed while moving in a central direction of the display unit 110.

Meanwhile, if a search instruction is input through the input unit 120, the controlling unit 130 may control the display unit 110 so that a search box for the search instruction and a letter UI are displayed. In addition, the controlling unit 130 may perform a control so that a movement speed of a pointer becomes slow while the pointer corresponding to the position of the pointing device moves over the displayed letter UI.

If a search word is input through the search box and the letter UI, the controlling unit 130 may control the display unit 110 so that a search result is displayed in the form of the first UI or the second UI described above.

By the display apparatus 100 as described above, the user may easily and instinctively control the display apparatus 100 and the contents displayed by the display apparatus 100.

Meanwhile, hereinafter, a method for displaying a UI will be described with reference to FIGS. 2A to 2F.

Figure 2A:
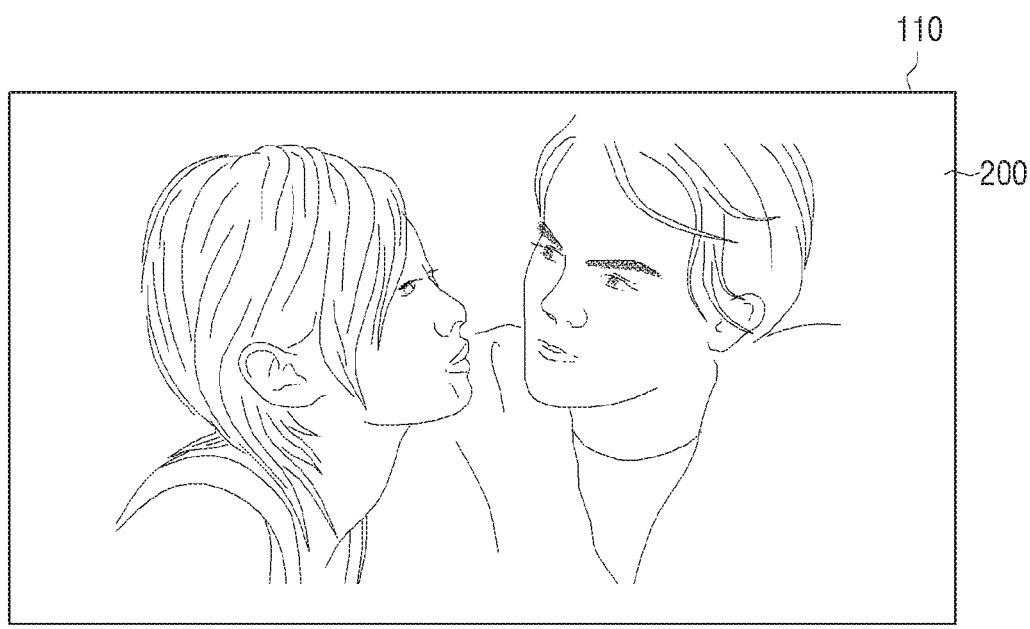
FIGS. 2A to 3B are diagrams illustrating a user interface (UI) displaying method of a display apparatus according to an exemplary embodiment.
Figure 2B:
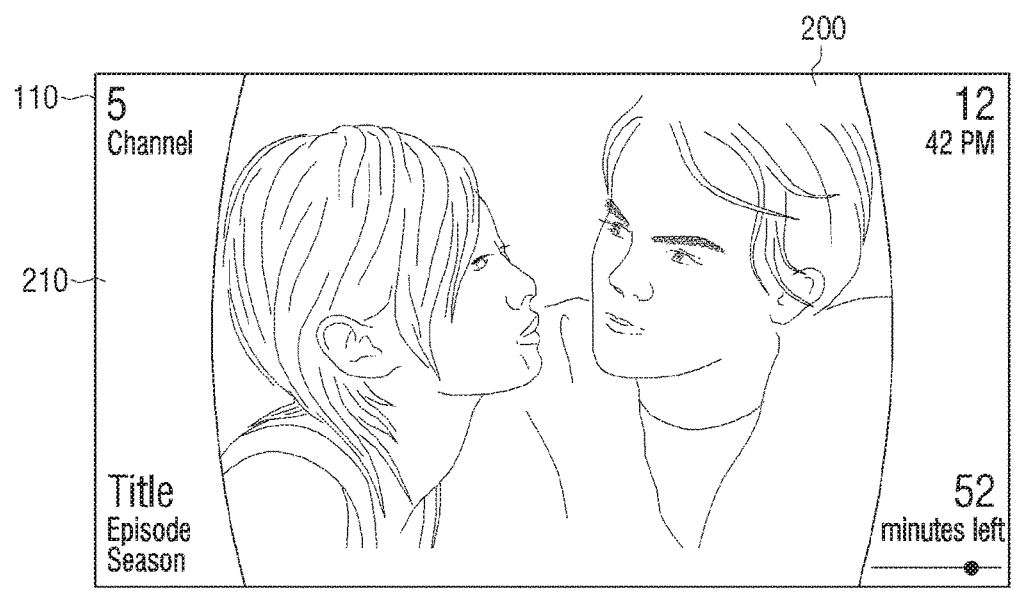

FIG. 2A is a diagram illustrating a figure in which the display apparatus 100 displays the contents 200, according to an exemplary embodiment. While the contents 200 illustrated in FIG. 2A is displayed, if the user command is input, the controlling unit 130 may perform a control so that an information UI 210 representing information on the displayed contents is displayed, as illustrated in FIG. 2B.

Specifically, if a manipulation touching the sensing region included in the input unit 120 is input from the user, the controlling unit 130 may display the information UI 210. The information UI 210 may display information on a channel number broadcasting the displayed contents, a title, and a running time, including current time information.

Meanwhile, the case in which the user manipulation for displaying the information UI 210 is the manipulation touching the sensing region is merely an exemplary embodiment, and in the case in which the input unit 120 includes a proximity sensor, the controlling unit 130 may perform a control so that the information UI 210 is displayed just by a manipulation in which a portion of a body of the user approaches the sensing region.

Figure 2C:
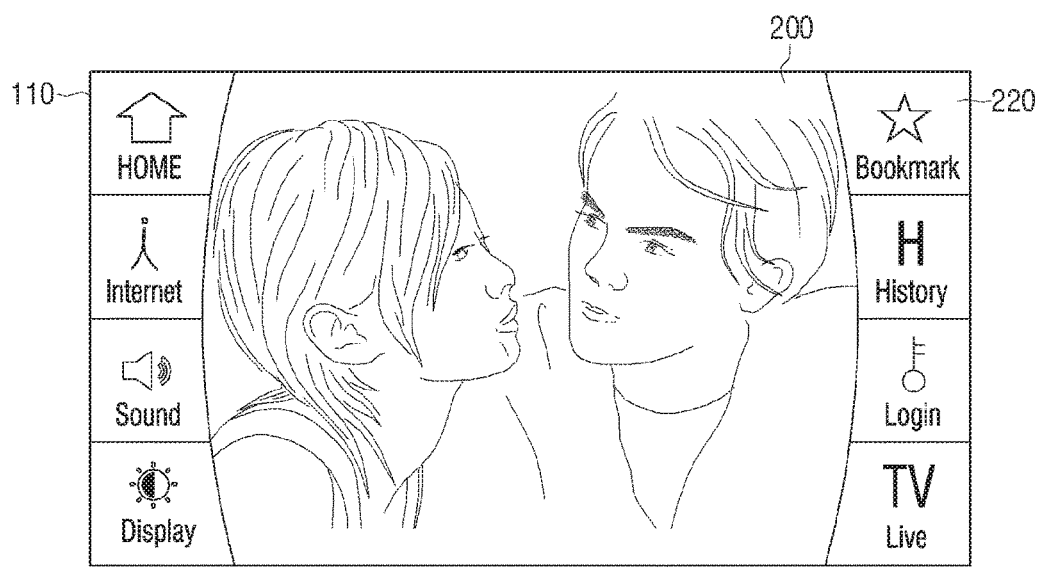

FIG. 2C is a diagram illustrating the display unit 110 displaying a menu UI 220, according to an exemplary embodiment. If a touch manipulation having larger pressure than the touch manipulation of the user for displaying the information UI 210 described above is input, the controlling unit 130 may display the menu UI 220 including a plurality of menus for controlling the display apparatus 100.

The input unit 120 may include a sensor sensing pressure that the user presses the sensing region. For example, the input unit 120 may include a force sensor and sense strength of force or a change in force of the user pressing the sensing region.

Therefore, if the touch manipulation is input through the input unit 120, the controlling unit 130 may perform a control so that the information UI 210 is first displayed, and if a touch having larger pressure than the input touch manipulation is again input, the controlling unit 130 may perform a control so that the menu UI 220 is displayed.

Meanwhile, if it is determined that strength of pressure is changed; the controlling unit 130 may inform the user that strength of pressure is changed. The force that the user presses the input unit 120 is linearly changed, but the controlling unit 130 determines a change in pressure by stages. Therefore, if it is determined that a manipulation of second pressure is input while a manipulation of first pressure is input, the controlling unit 130 may inform the user that input pressure is changed and a manipulation different from a case in which the first pressure is input is executed, using a method such as an alarm, a light emitting of a light emitting diode (LED), or vibration of a controller.

In the case in which the input unit 120 includes the proximity sensor, the controlling unit 130 may also perform a control so that the information UI 210 is displayed, if the approaching of the user is sensed by the input unit 120, and may also perform a control so that the menu UI 220 is displayed, if the touch of the user is sensed.

Meanwhile, in the case in which the sensor included in the input unit 120 may not sense the change in pressure of the touch manipulation of the user, the controlling unit 130 may also perform a control so that an input time of the touch manipulation of the user input through the input unit 120 is counted and the UI is displayed.

That is, if the touch manipulation is input through the input unit 120, the controlling unit 130 may perform a control so that the information UI 210 is first displayed, and if the touch manipulation is maintained more than the threshold time, the controlling unit 130 may perform a control so that the menu UI 220 is displayed.

Meanwhile, the menus included in the menu UI 220 illustrated in FIG. 2C are merely an exemplary embodiment, and may be varied depending on an initial setting, a user setting, or the like of the display apparatus 100.

Figure 2D:
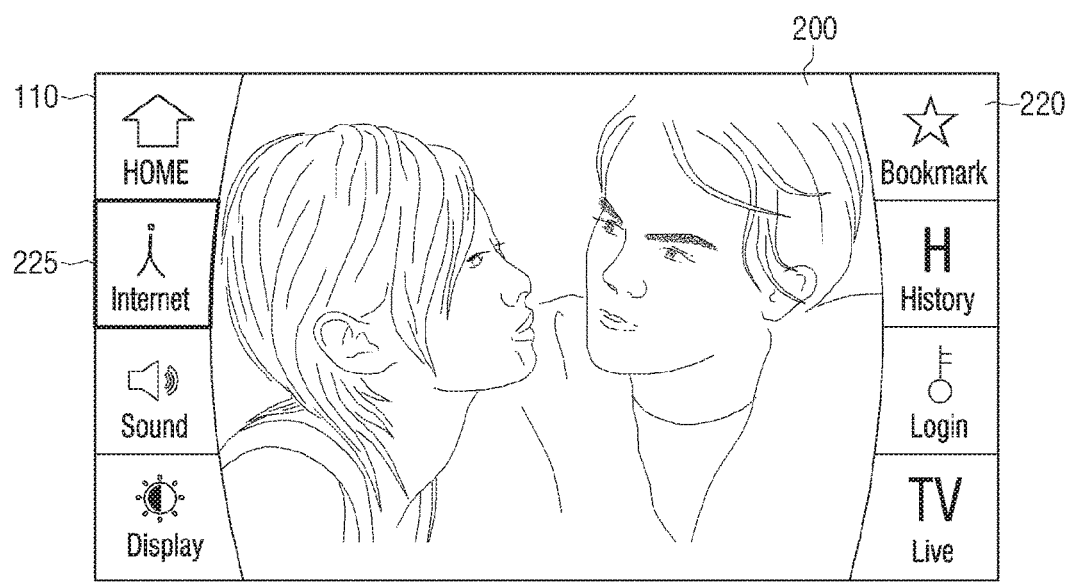

FIG. 2D is a diagram illustrating the display unit 110 indicating a highlight 225 on one menu of the menus included in the menu UI 220, according to an exemplary embodiment. The input unit 120 may be implemented as the pointing device for controlling the display apparatus 100. Therefore, the controlling unit 130 may display the highlight 225 that indicates an edge of the menu corresponding to a position at which the pointing device points the display unit 110 by a bold line.

The highlight 225 may be indicated by a scheme in which a menu to be highlighted is indicated by a different color or a separate icon is displayed on the corresponding menu as well as the bold line.

In addition, in the case in which the input unit 120 is implemented as a remote controller including a 4-direction button or a toggle button, not the pointing device, the controlling unit 130 may move the indicated highlight by a user manipulation pressing the 4-direction button or a user manipulation moving the toggle button.

Figure 2E:
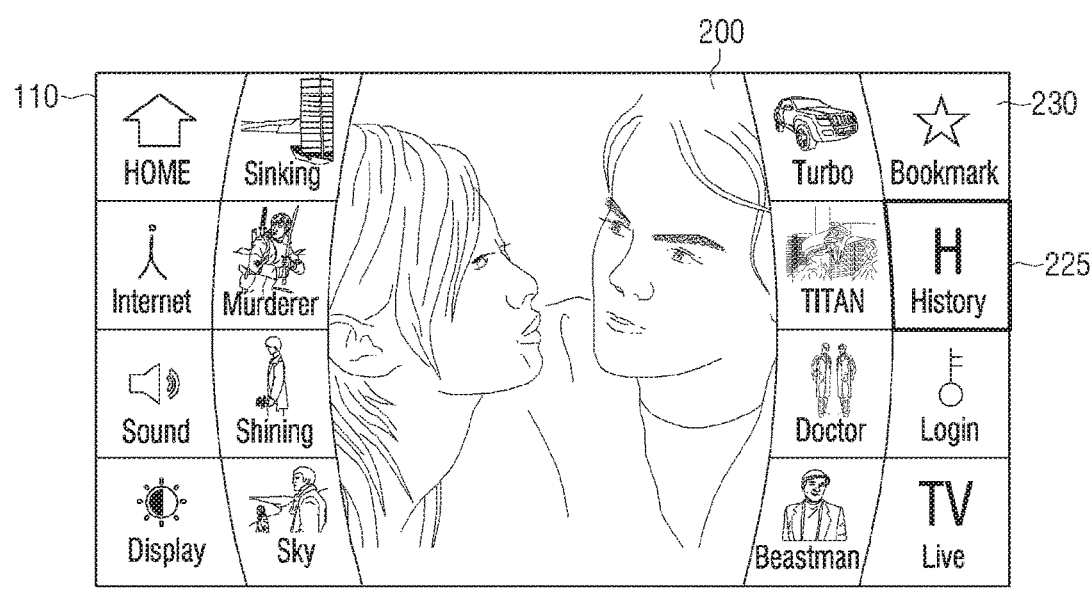

Meanwhile, by the method described above, in the case in which the indication of the highlight 225 displayed on the menu UI 220 is positioned on a "history menu" for informing recently executed contents and a preset threshold time is spent, the controlling unit 130 may perform a control so that an enlarged menu UI 230 is displayed, as illustrated in FIG. 2E.

That is, the controlling unit 130 may perform the control so that the enlarged menu UI 230 is displayed by displaying a UI having a form similar to the menu UI 220 inside the displayed menu UI 220 together with the menu UI 220. Therefore, the enlarged menu UI 230 may indicate all of the contents included in a selected menu of the menu UI and the plurality of menus included in the menu UI.

As described above, in the case in which the highlight indication 225 is positioned on one menu of the plurality of menus included in the menu UI 220 and the threshold time is spent, the enlarged menu UI 230 may be automatically displayed. Meanwhile, in the case in which the highlight 225 is indicated on one menu of the plurality of menus included in the menu UI 220 and a specific user manipulation is input, the controlling unit 130 may also perform a control so that the enlarged menu UI 230 is displayed.

For example, in the case in which the input unit 120 includes a sensor for sensing pressure of the input touch manipulation, the controlling unit 130 may perform a control so that the enlarged menu UI 230 is displayed when a touch having larger pressure than the touch manipulation input through the input unit 120 in order to display the menu UI 220 is again input.

Alternatively, in the case in which the touch manipulation is input for a longer time than the touch manipulation input through the input unit 120 in order to display the menu UI 220, the controlling unit 130 may perform a control so that the enlarged menu UI 230 is displayed.

Meanwhile, the sensing region included in the input unit 120 implemented as the remote controller or the pointing device may include a click button. That is, the user may input the touch manipulation by touching the sensing region at threshold pressure or less, but may also input a click instruction by a manipulation pressing the sensing region at threshold pressure or more. Therefore, in the case in which the click manipulation is input through the input unit 120, the controlling unit 130 may perform a control so that the enlarged menu UI 230 is displayed.

Figure 2F:
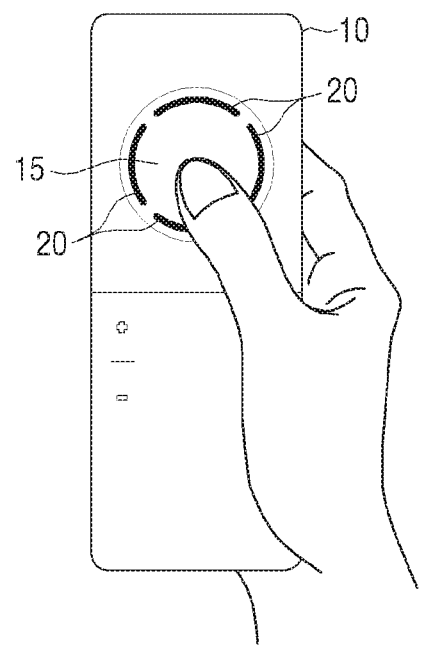

Specifically, FIG. 2F is a diagram illustrating an exemplary embodiment in which the input unit 120 is implemented as an external controller 10. The controller 10 may be implemented as the pointing device. The controller 10 may include a sensing region 15 capable of receiving a touch, a press, or a click manipulation of the user, and a 4-direction button 20.

The sensing region 15 may include a proximity sensor, a touch sensor, a force sensor, and the like, to sense strength of the touch manipulation input from the user.

In addition, the sensing region 15 may be implemented by a flexible material such as fabric, plastic, or rattan. Therefore, the controlling unit 130 may control a form of the displayed UI depending on strength that the user presses the sensing region 15.

For example, as the strength pressing the sensing region 15 is increased, the controlling unit 130 may perform a control so that the information UI 210, the menu UI 220 and the enlarged menu UI 230 are displayed in this order.

Figure 3A:
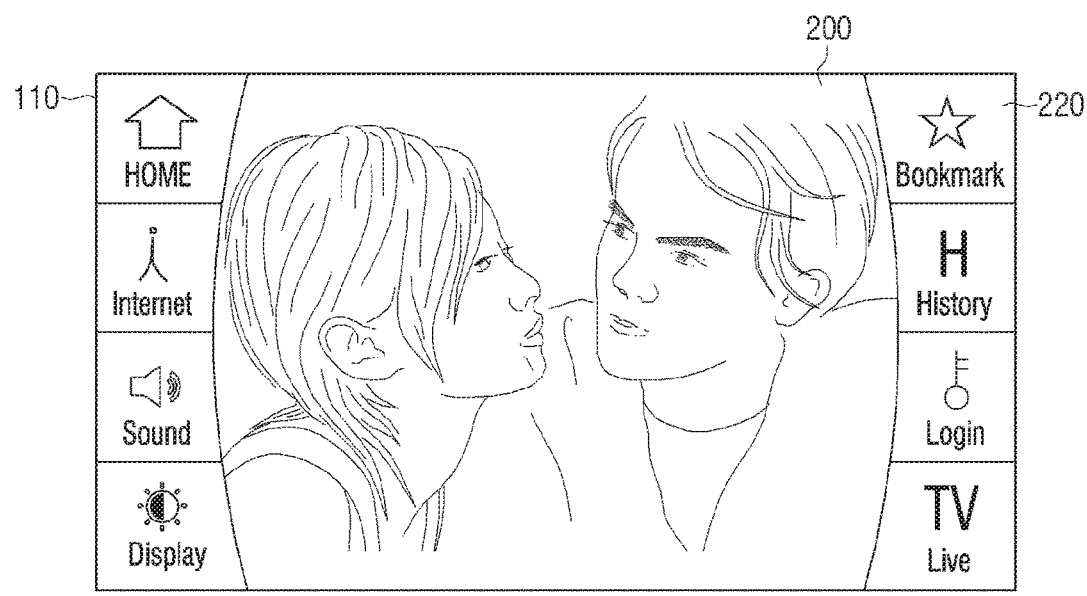

That is, in the case in which a user command pressing the sensing region 15 is input from the user, the controlling unit 130 may perform a control so that the menu UI 220 including only menus which are often used is displayed so as not to disturb a watching of the contents, as illustrated in FIG. 3A. In addition, in the case in which the strength of the user manipulation pressing the sensing region 15 is increased, the controlling unit 130 may perform a control so that the enlarged menu UI 300 including the more number of menus is displayed, as illustrated in FIG. 3B.

Meanwhile, the controlling unit 130 may perform a control so that a highlight 305 is indicated on one menu of a plurality of menus included in the enlarged menu UI 300. In addition, in the case in which a user manipulation scrolling the sensing region 15 in a clockwise direction or a counter-clock wise direction is input, the controlling unit 130 may move the highlight 305 according to a direction of the input scroll manipulation and may display the moved highlight 305.

Figure 3B:
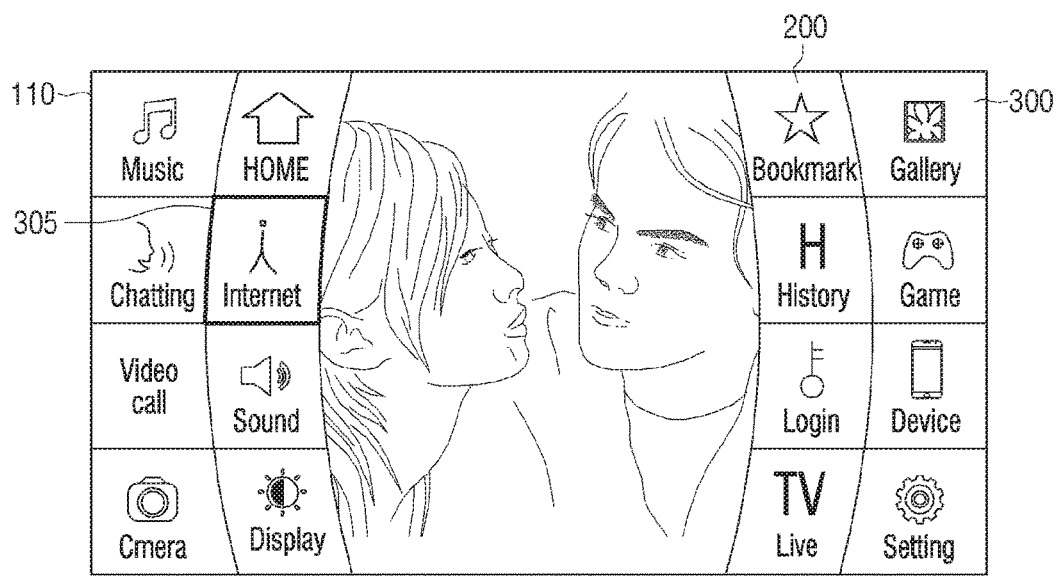

For example, as illustrated in FIG. 3B, in the case in which the highlight 305 is indicated on an "Internet menu" and the user manipulation scrolling the sensing region 15 in the clockwise direction is input, the indication of the highlight 305 may be moved in the order of "Internet menu", "home menu", "bookmark menu" and "history menu".

In addition, in the case in which the controller 10 is implemented as the pointing device, the highlight 305 may be indicated on "Internet menu", and in the case in which the user moves the controller 10 to the left, the controlling unit 130 may perform a control so that the highlight 305 is indicated on "chatting menu".

In the case in which the highlight 305 is indicated on "chatting menu" and the user manipulation scrolling the sensing region 15 in the clockwise direction is input, the indication of the highlight 305 may be moved in the order of "chatting menu", "music menu", "gallery menu", and "game menu".

Therefore, the user may instinctively feel that the UI is displayed according to the user manipulation, using the controller 10 including the sensing region 15 and implemented as the pointing device.

Meanwhile, FIGS. 4A to 4E are diagrams illustrating a method for searching contents by the display apparatus 100 and displaying a search result, according to an exemplary embodiment.

Figure 4A:
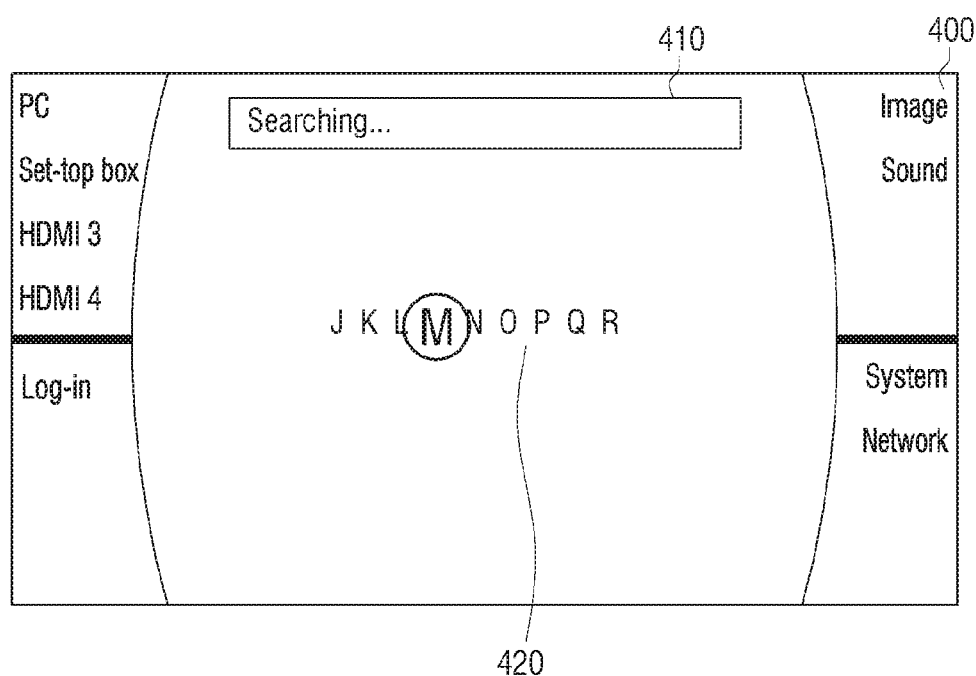
FIGS. 4A to 4E are diagrams illustrating a method for searching contents by a display apparatus and displaying a search result, according to an exemplary embodiment.

Specifically, FIG. 4A is a diagram illustrating a display unit 110 on which an information UI 400, a search box 410, and a letter UI 420 are displayed, according to an exemplary embodiment.

As described above, in the case in which the touch manipulation is input through the input unit 120, the controlling unit 130 may perform a control so that the information UI 400 is displayed. In addition, in the case in which a search instruction is input through the input unit 120, the controlling unit 130 may perform a control so that the search box 410 for the search and the letter UI 420 for inputting words to be searched are displayed.

For example, in the case in which a separate search button is included in the controller 10 implemented as the input unit 120, if a manipulation pressing the search button is input from the user, the controlling unit 130 may perform a control so that the search box 410 for the search and the letter UI 420 for inputting words to be searched are displayed.

In addition, in the case in which a user command executing search menus included in the displayed menu UI 220 is input, the controlling unit 130 may perform a control so that the search box 410 and the letter UI 420 are displayed.

In the case in which the display apparatus 100 includes a microphone (not illustrated), the user may input a search word using a voice.

Meanwhile, in the case in which the search word is input by the letter UI 420 using the controller 10 implemented as the pointing device, the controlling unit 130 may enlarge and display a letter of the letter UI 420 corresponding to a position of the pointing device, and control speed of a pointer corresponding to the position of the pointing device.

Specifically, in the case in which the pointer corresponding to the position of the pointing device is positioned on the letter UI 420, the controlling unit 130 may indicate the highlight on a letter corresponding to the position of the pointer among the letters included in the letter UI 420. That is, as illustrated in FIG. 4A, the controlling unit 130 may perform a control so that the letter corresponding to the position of the pointer is enlarged and displayed.

In addition, the controlling unit 130 may perform a control so that a movement speed of a pointer is decreased while the pointer corresponding to the position of the pointing device moves over the letter UI 420. That is, in order for the user selecting the letter at remote to easily select the letter, the controlling unit 130 may perform a control so that the movement speed of the pointer is decreased while the pointer corresponding to the position of the pointing device stays over the letter UI 420.

Figure 4B:
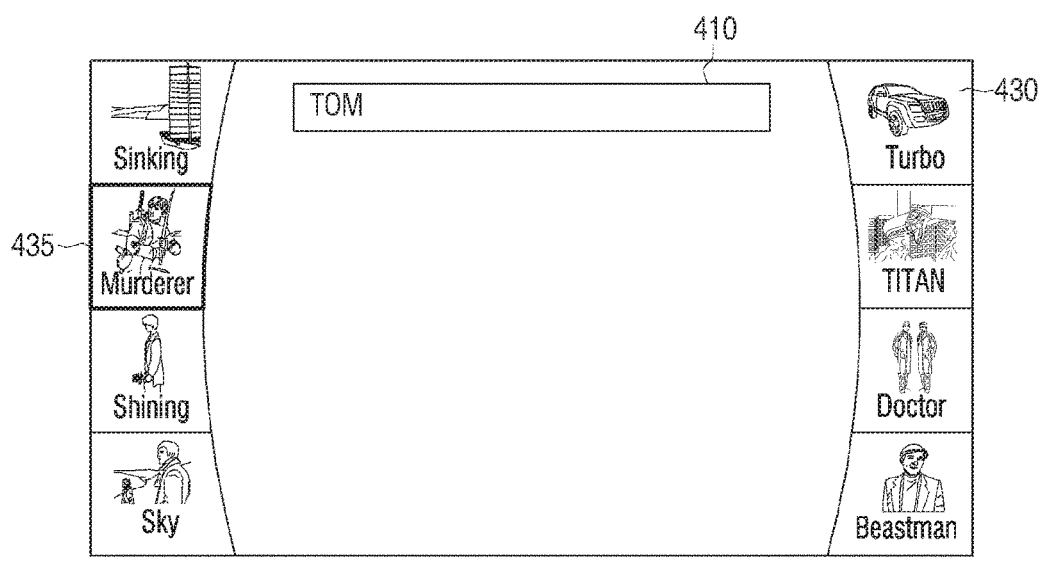

FIG. 4B is a diagram illustrating the display unit 110 displaying a search result UI 430, according to an exemplary embodiment.

That is, in the case in which "TOM" is input to the search box 410 from the user using the letter UI 420 described above, the controlling unit 130 may collect information associated with a search word "TOM" by performing a web search or communication with an external server.

In addition, the controlling unit 130 may perform a control so that the search result UI 430 is displayed on both edges of the display unit 110 so as not to disturb the watching of the contents. That is, in the case in which the search word "TOM" is a name of an actor, the controlling unit 130 may perform a control so that the search result UI 430 including movie contents in which the actor "TOM" appears is displayed.

As described above, the controlling unit 130 may indicate a highlight 435 on one contents of the contents included in the search result UI 430. In addition, in the case in which the indication of highlight 435 is not moved more than a threshold time, or a user command selecting the contents on which the highlight 435 is indicated is input through the input unit 120, the controlling unit 130 may reproduce the contents on which the highlight is positioned.

Figure 4C:
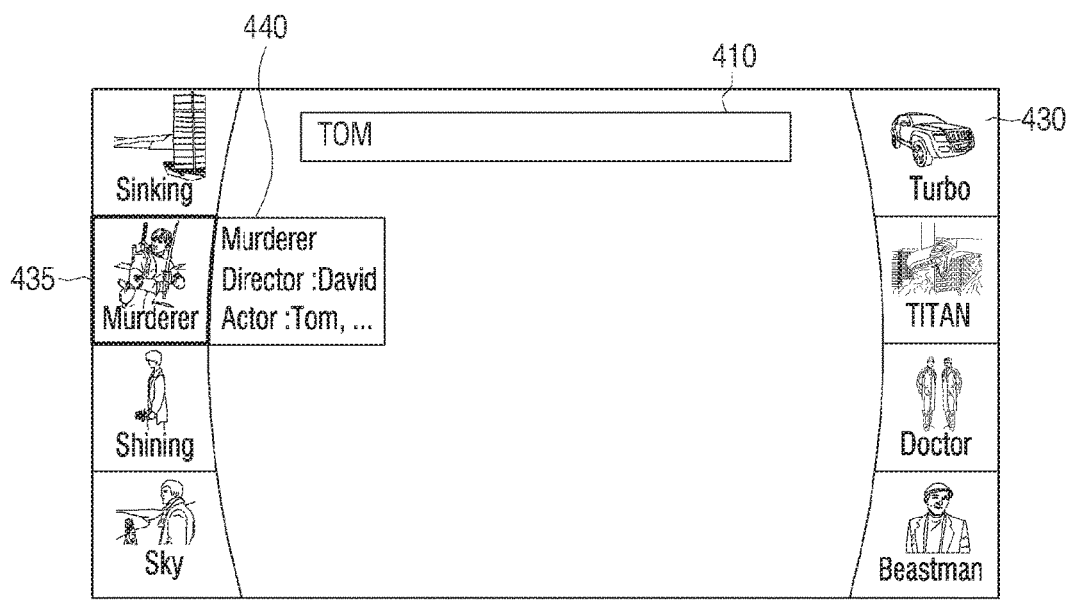

For example, in the case in which a user command of moving the indication of the highlight 435 is not input more than the threshold time, the controlling unit 130 may display information 440 on the contents on which the highlight 435 is indicated, as illustrated in FIG. 4C.

Figure 4D:
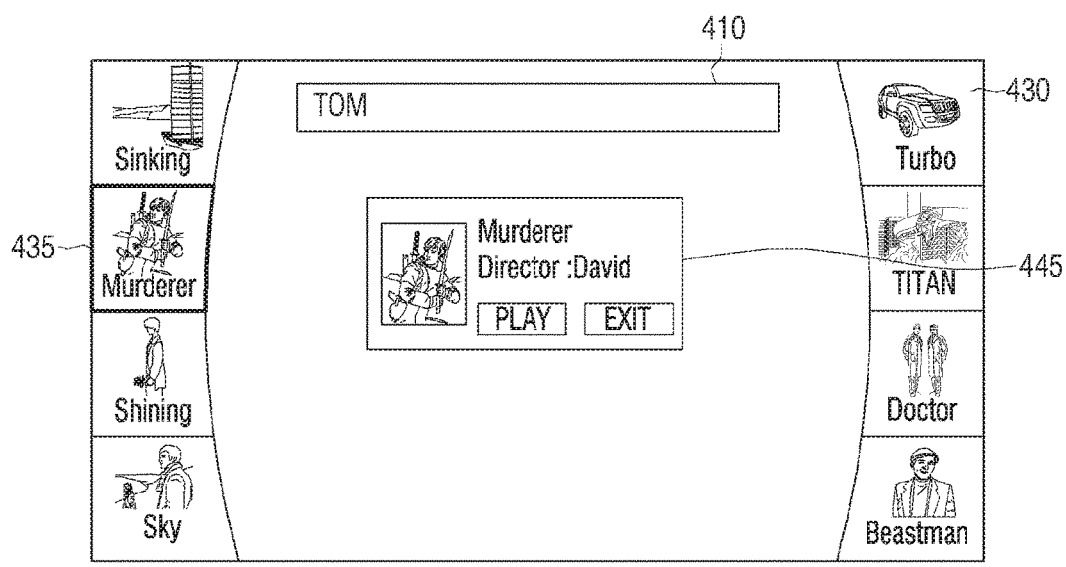

Alternatively, as illustrated in FIG. 4D, the controlling unit 130 may display a window 445 for receiving the information on the contents on which the highlight 435 is indicated and a reproduction instruction.

Meanwhile, in the case in which the indication of the highlight 435 is not moved more than the threshold time or the user command is input, the controlling unit 130 may also perform a control so that the contents on which the highlight 435 are indicated is immediately executed, as illustrated in FIG. 4C or 4D.

In addition, as described above, in the case in which the sensing region 15 of the controller 10 implemented as the pointing device is moved while being pressed, the controlling unit 130 may perform a control so that the indication of the highlight 435 is moved along the movement of the controller 10. In addition, in the case in which the user stops the manipulation pressing the sensing region 15, the controlling unit 130 may perform a control so that the contents, on which the highlight 435 is indicated, of the timing at which the manipulation is stopped are executed.

Figure 4E:
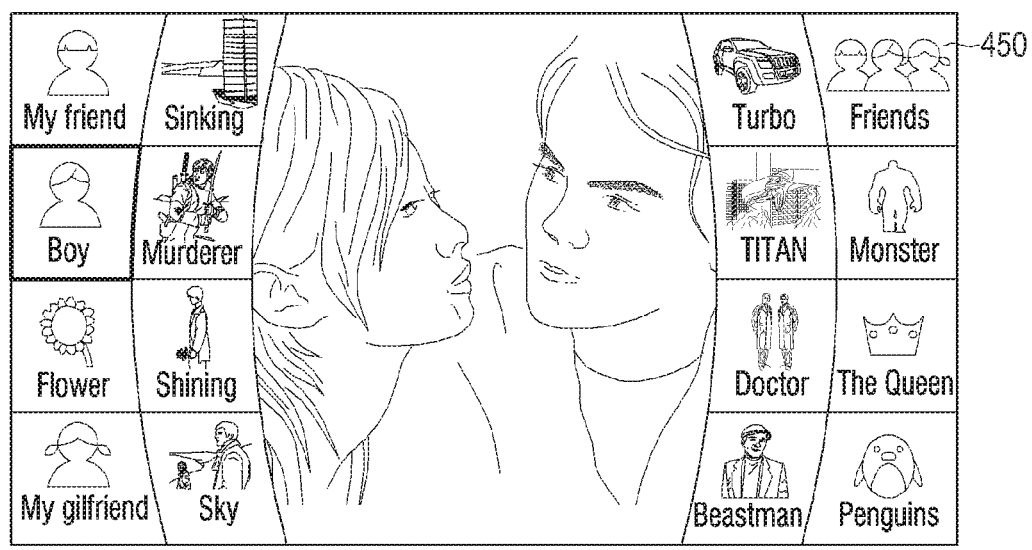

Meanwhile, FIG. 4E is a diagram illustrating the display unit 110 displaying a search result UI 450, according to another exemplary embodiment. That is, in the case in which there are too many search results, which may not be displayed on both edges of the display unit 110 in a line, the controlling unit 130 may display the search result UI 450 on both edges of the display unit 110 in two lines, as illustrated in FIG. 4E.

Alternatively, in the case in which the search word is input from the user and the user manipulation pressing the sensing region 15 for the search is input, in order not to disturb the watching of the user of the displayed contents 200, the controlling unit 130 may perform a control so that the search result UI 430 as illustrated in FIG. 4B is displayed by a primary search result.

In the case in which a user manipulation having larger pressure than the pressure pressing the sensing region 15 is input while the search result UI 430 is displayed, the controlling unit 130 may perform a control so that the search result UI 450 including more search results is displayed, as illustrated in FIG. 4E.

Meanwhile, as the pressure of the user manipulation pressing the sensing region 15 is increased, the controlling unit 130 may control the display unit 110 so that more search results are displayed by the search result UI 430.

FIGS. 5A to 5D are diagrams illustrating the display unit 110 displaying a user interface (UI) including menus corresponding to a lower category, according to an exemplary embodiment.

Figure 5A:
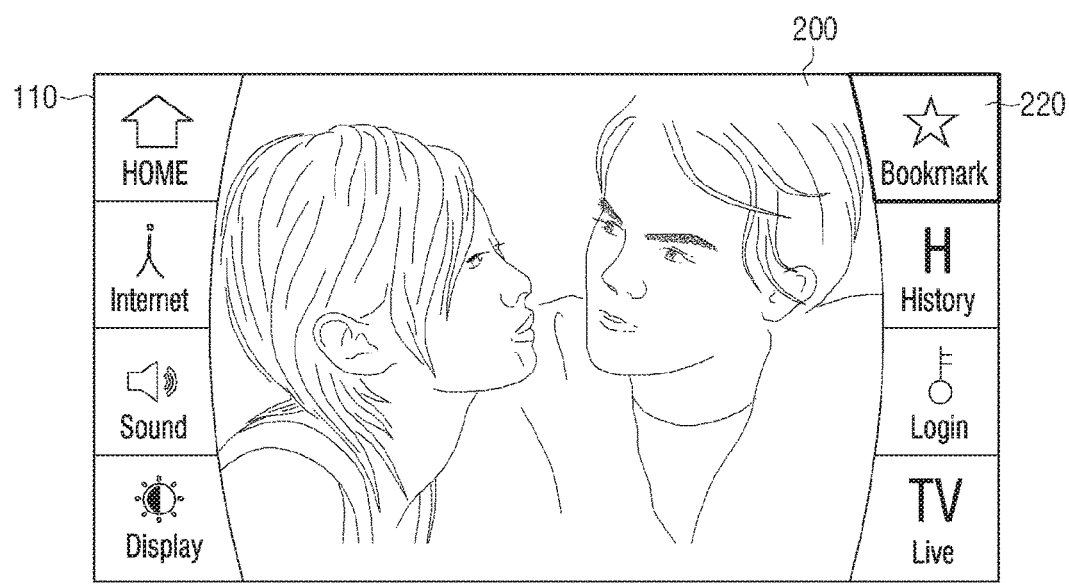
FIGS. 5A to 5D are diagrams illustrating a display unit 110 displaying a user interface (UI) including menus corresponding to a lower category, according to an exemplary embodiment.

First, FIG. 5A is a diagram illustrating the display unit 110 displaying the displayed menu UI 220 by the method as described above.

In the case in which the highlight is indicated on "bookmark menu" by a user manipulation moving the indication of the highlight by a method of circularly scrolling the sensing region 15 of the controller 10 in a predetermined direction, moving the controller 10 implemented as the pointing device while touching the sensing region 15, or the like, and if a user manipulation pressing the sensing region 15 at larger pressure is further input, the controlling unit 130 may perform a control so that a UI 500 including the menus included in the lower category of "bookmark menu" is displayed.

Figure 5B:
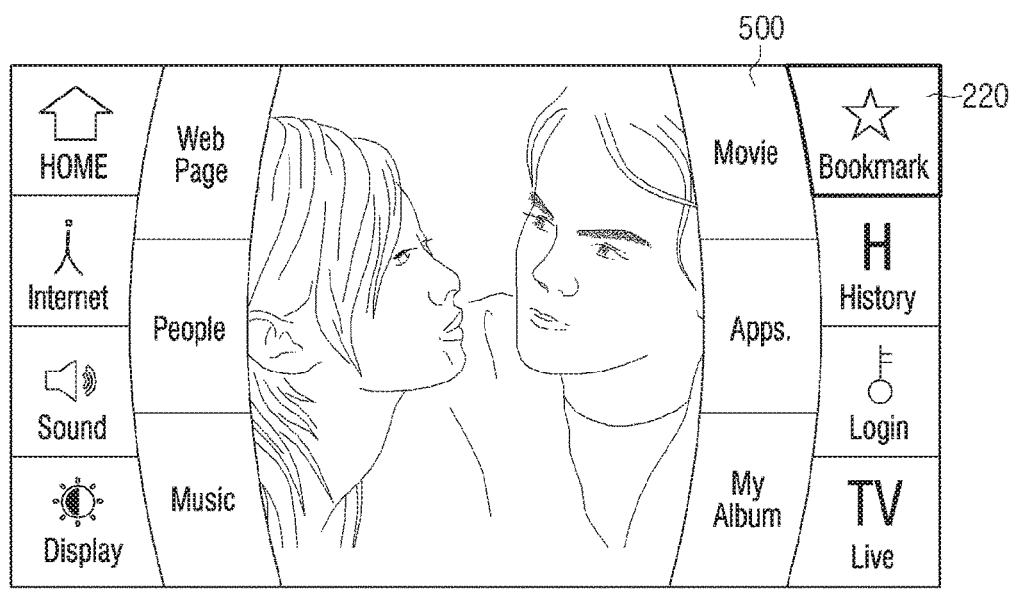

That is, as illustrated in FIG. 5B, the controlling unit 130 may perform a control so that the UI 500 including the menus corresponding to the lower category of "bookmark menu" is displayed inside the menu UI 220.

Figure 5C:
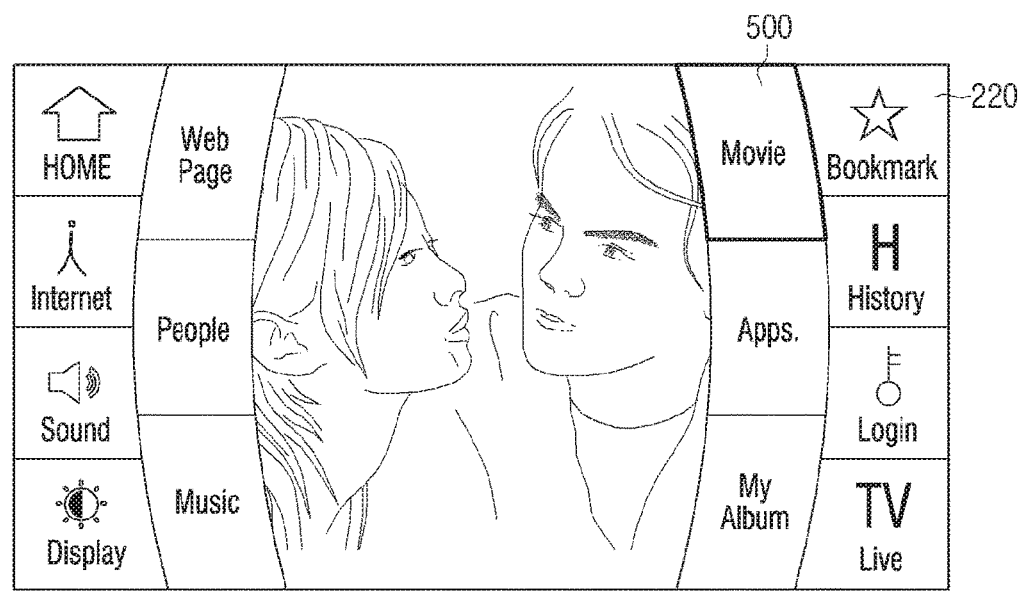

FIG. 5C is a diagram illustrating a figure in which the highlight is moved to the UI 500 including the lower category menus by the user manipulation, according to an exemplary embodiment. For example, in the case in which a user manipulation pressing a left direction button of the 4-direction button 20 included in the controller 10 is input or a user manipulation moving the controller 10 implemented as the pointing device in the left is input, the controlling unit 130 may move the indication of the highlight to "movie menu".

In the case in which the highlight is indicated on "movie menu" and a user manipulation pressing the sensing region 15 at larger pressure is further input, the controlling unit 130 may perform a control so that a UI 510 including menus included in a lower category of "movie menu" is further displayed.

Meanwhile, in the case in which the UIs are displayed trebly and excessively cover the displayed contents 200, the user may experience discomfort in watching the contents 200. Therefore, the controlling unit 130 may perform a control so that the UI 500 including the lower category menus is displayed on a position at which the menu UI 220 is displayed, and the UI 510 including the lower category menus of "movie menu" is displayed on a position on which the UI 500 including the lower category menus is displayed, as illustrated in FIG. 5D.

In addition, by the method described above, the controlling unit 130 may move a highlight 515 indicated on "movie menu" to the lower category menus of "movie menu" and display the moved highlight 515.

Figure 6A:
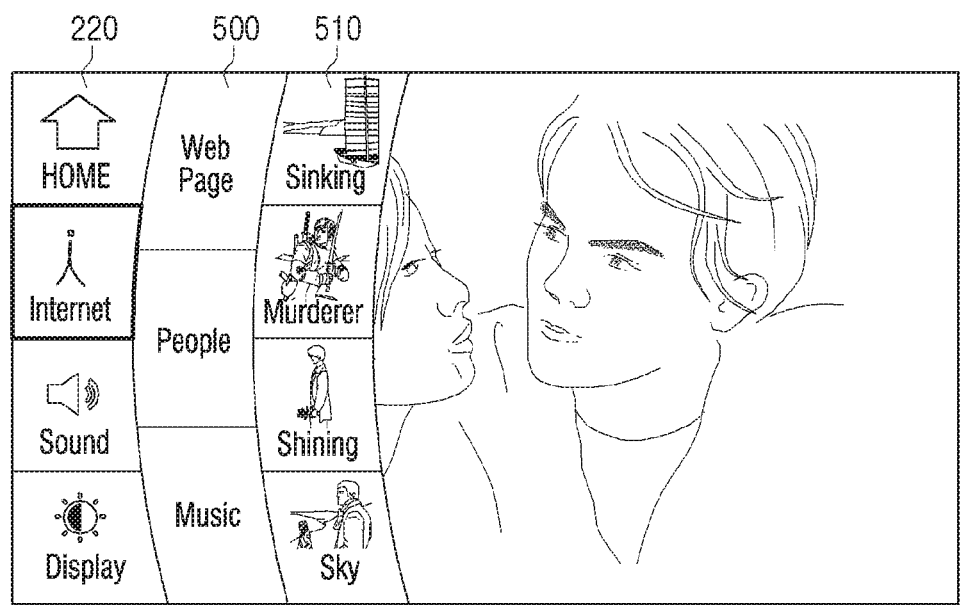
FIGS. 6A and 6B are diagrams illustrating a displaying method of an enlarged menu UI.
Figure 6B:
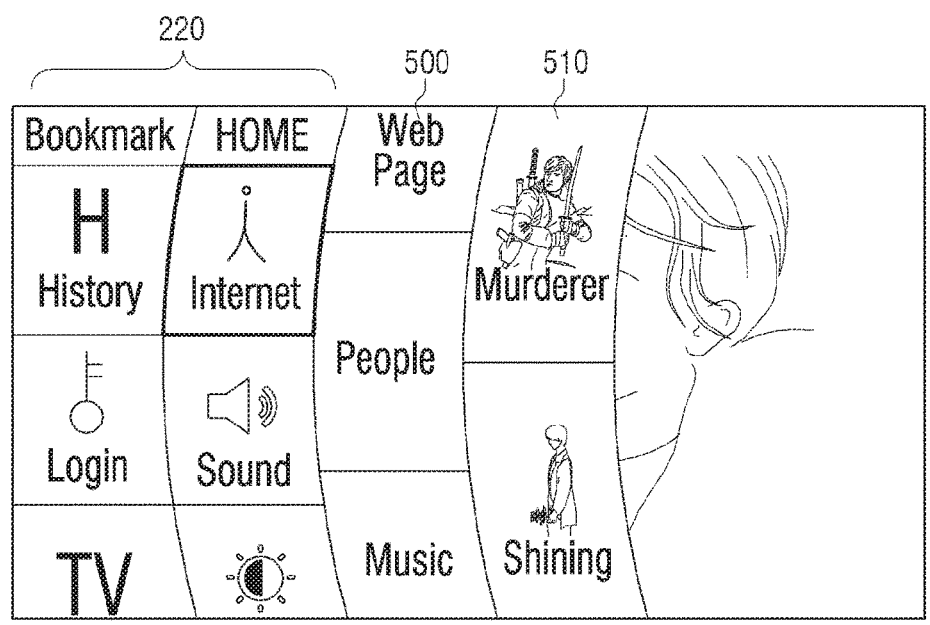

Meanwhile, FIGS. 6A and 6B are diagrams illustrating a method for enlarging and displaying a menu UI according to another exemplary embodiment.

Figure 5D:
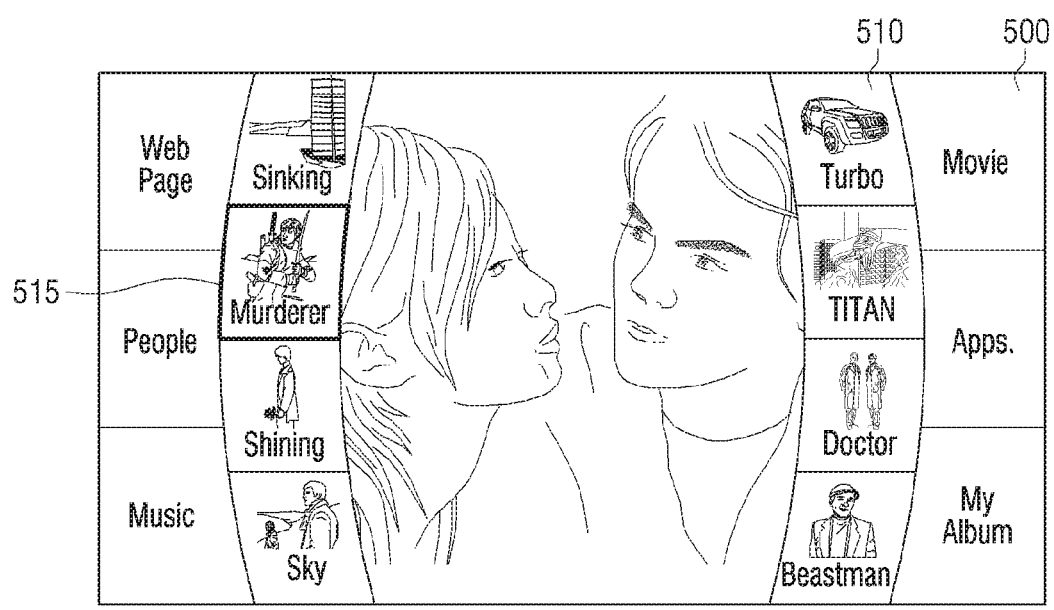

That is, as illustrated in FIG. 5D, in order not to disturb the watching of the user of the contents 200, the controlling unit 130 may perform a control so that the UIs 500 and 510 including the lower category menus except for the menu UI 220 are displayed.

In this case, the controlling unit 130 may display the UIs like as the menu UI 220 exists out of the display unit 110. For example, in the case in which the user performs a manipulation moving the controller 10 implemented as the pointing device to the left for the display unit 110 as illustrated in FIG. 5D, the controlling unit 130 may perform a display like as the menu UI 220 present in a left outer portion of the display unit 110 appears on the display unit 110 while the UI indicated on a left edge of the display unit 110 is moved to the right along the movement of the pointing device.

Therefore, as illustrated in FIG. 6A, the controlling unit 130 may remove the UIs displayed on the right edge of the display unit 110 like as overall UIs are moved to the right, and may display the UIs displayed on the left edge of the display unit 110 like as they are drawn to the right.

On the contrary, in the case in which the user performs a manipulation moving the controller 10 implemented as the pointing device to the right for the display unit 110 as illustrated in FIG. 5D, the controlling unit 130 may perform a display like as the menu UI 220 present in a right outer portion of the display unit 110 appears on the display unit 110 while the UI indicated on a right edge of the display unit 110 is moved to the left along the movement of the pointing device.

Therefore, the controlling unit 130 may remove the UIs displayed on the left edge of the display unit 110 like as the overall UIs are moved to the left, and may display the UIs displayed on the right edge of the display unit 110 like as they are drawn to the left.

In addition, FIG. 6B is a diagram illustrating a UI displayed when a user manipulation enlarging and moving the UI is input.

For example, in the case in which a user manipulation moving the UI to the left of the display unit 110 while pressing the sensing region 15 of the controller 10 implemented as the pointing device is input, the controlling unit 130 may display the menu UI 220 present in a left outer portion of the display unit 110 like as it appears to be enlarged on the display unit 110. In addition, the controlling unit 130 may display the UIs 500 and 510 including the menus corresponding to the lower category like as they are enlarged at the same ratio.

The controlling unit 130 may indicate the highlight on one menu included in the enlarged UI. In addition, in the case in which a user manipulation upwardly moving the controller 10 for the display unit 110 is input, the controlling unit 130 may display a form in which a UI positioned in an upper outer direction of the display unit 110 is moved to an inside of the display unit 110. On the contrary, in the case in which a user manipulation downwardly moving the controller 10 for the display unit 110 is input, the controlling unit 130 may display a form in which a UI positioned in a lower outer direction of the display unit 110 is moved to an inside of the display unit 110.

Figure 7A:
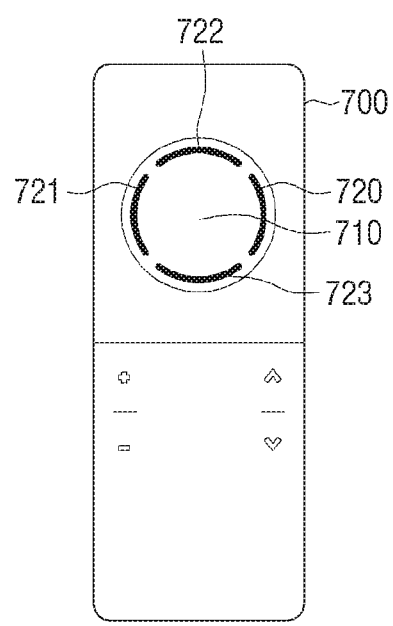
FIGS. 7A to 7C are diagrams illustrating a controlling method of a display of contents using a controller including a sensing region according to an exemplary embodiment.
Figure 7B:
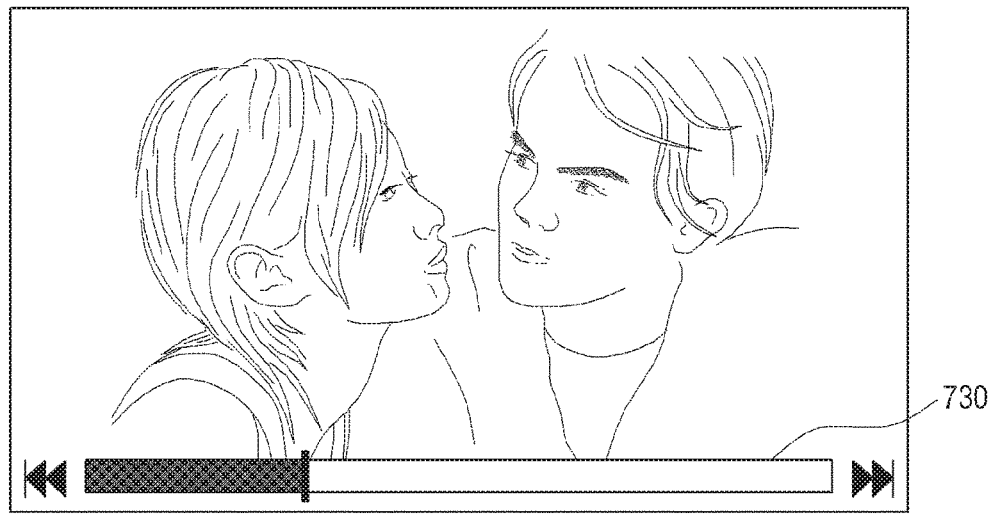
Figure 7C:
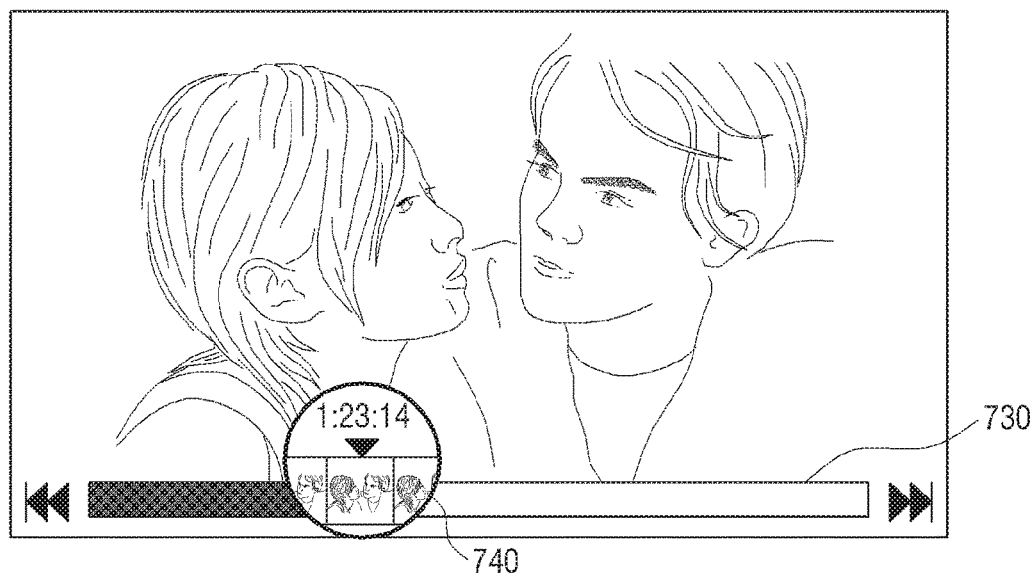

Meanwhile, FIGS. 7A to 7C are diagrams illustrating a controlling method of a display of contents using the controller including the sensing region according to an exemplary embodiment.

FIG. 7A is a diagram illustrating a controller 700 according to an exemplary embodiment. The controller 700 may include a sensing region 710 including at least one sensor of a proximity sensor, a touch sensor, and a force sensor. Particularly, the sensing region 710 may be implemented by a flexible material to have a form deformed according to pressure that the user presses the sensing region 710.

In addition, the controller 700 may include 4-direction buttons 720 to 723 at an edge of the sensing region 710 which is implemented in a circle shape. Therefore, in the case in which a user manipulation pressing the right button 720 of the 4-direction buttons while image contents are displayed is input, the controlling unit 130 may display next contents. In addition, in the case in which a user manipulation pressing a left button 721 is input, the controlling unit 130 may display previous contents.

Meanwhile, in the case in which a user manipulation pressing an upper button 722 is input, the controlling unit 130 may pause reproduction of the contents or play the contents. In the case in which a user manipulation pressing a lower button 723 is input, the controlling unit 130 may display a progress bar 730 as illustrated in FIG. 7B or may hide the displayed progress bar 730.

The functions mapped to the 4-direction buttons as described above are merely exemplary embodiments, and functions executed when the respective buttons are pressed may be different depending on a kind of the reproduced contents or a setting.

Meanwhile, the controlling unit 130 may adjust reproduction speed of the displayed contents by a user manipulation scrolling the sensing region 710 which is implemented in a circle shape. For example, in the case in which a user manipulation scrolling the sensing region 710 in a clockwise direction while the image contents are displayed is input, the controlling unit 130 may control the reproduction speed of the displayed contents to be fast in a forward direction. That is, the controlling unit 130 may perform a fast forward for the contents.

On the contrary, in the case in which a user manipulation scrolling the sensing region 710 in a counterclockwise direction while the image contents are displayed is input, the controlling unit 130 may control the reproduction speed of the displayed contents to be fast in a backward direction. That is, the controlling unit 130 may perform a rewind for the contents.

Meanwhile, in the case in which a user manipulation pressing the sensing region 710 is input, the controlling unit 130 may enlarge a portion of the progress bar 730 to provide an enlarged progress bar 740. Therefore, in the case in which a user command moving the controller 700 to the right of the display unit 110 while pressing the sensing region 710 is input from the user, the controlling unit 130 may move a reproduction position to the right on the enlarged progress bar 740.

On the contrary, in the case in which a user command moving the controller 700 to the left of the display unit 110 while pressing the sensing region 710 is input from the user, the controlling unit 130 may move the reproduction position to the left on the enlarged progress bar 740.

That is, the controlling unit 130 may provide the enlarged progress bar 740 according to the user manipulation to allow the user to precisely adjust the reproduction position.

Figure 8A:
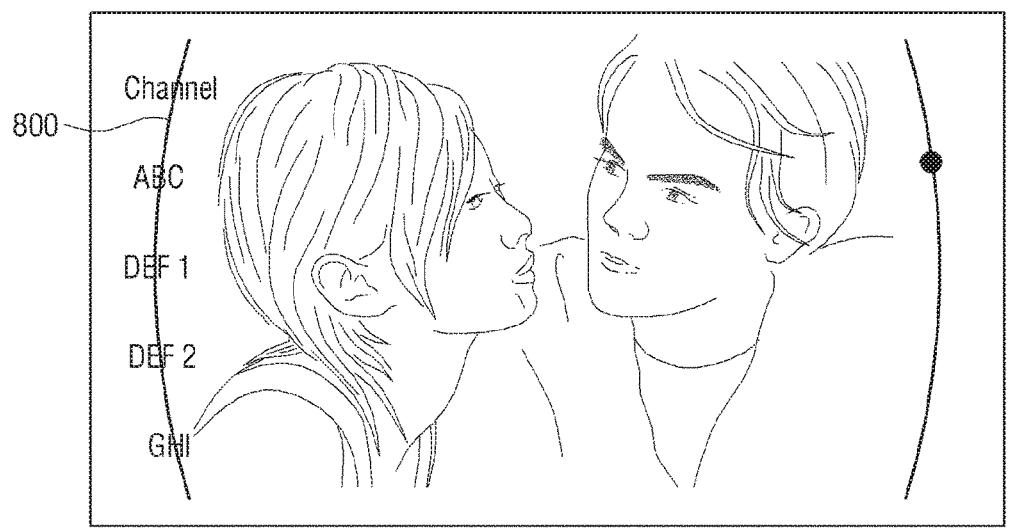
FIGS. 8A and 8B are diagrams illustrating various forms of the UI.
Figure 8B:
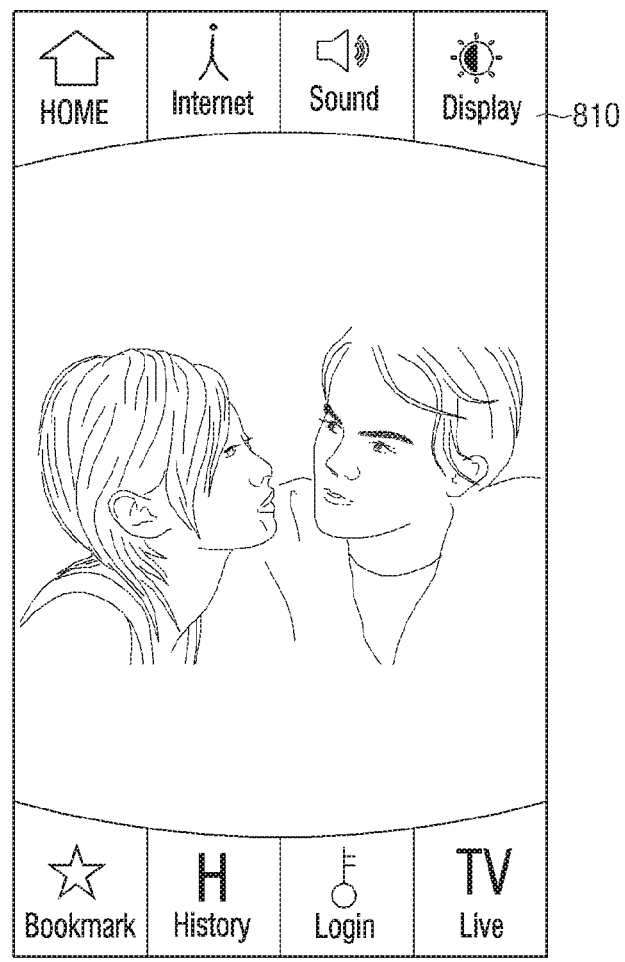

Meanwhile, FIGS. 8A and 8B are diagrams illustrating various forms of the UI. The controlling unit 130 may display the UI in a form illustrated in FIG. 8A. In addition, in the case in which the display unit 110 is implemented in a form in which a height thereof is longer than a width thereof, the controlling unit 130 may display the UI on upper and lower edges of the display unit 110, as illustrated in FIG. 8B.

Figure 9:
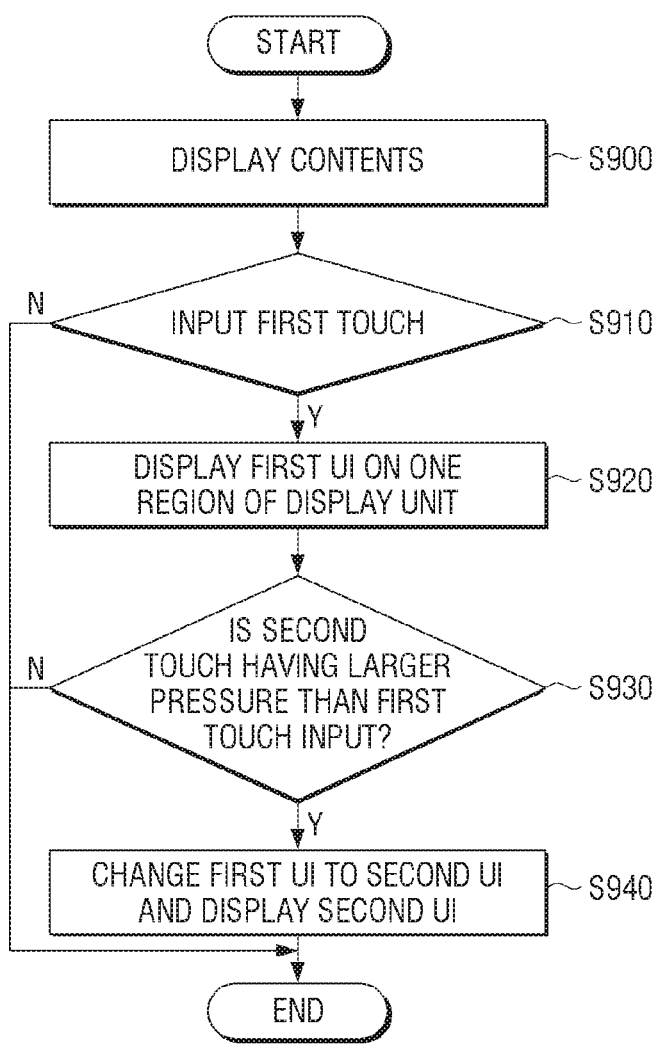
FIG. 9 is a flow chart illustrating a displaying method of a display apparatus according to an exemplary embodiment.

FIG. 9 is a flow chart illustrating a displaying method of a display apparatus according to an exemplary embodiment.

First, the display apparatus 100 may display the contents (S900). In the case in which a first touch is input to the display apparatus 100 (Y in S910), the display apparatus 100 displays a first UI on one region of the display unit (S920).

In the case in which a second touch having larger pressure than the first touch is input while the first UI is displayed (Y in S930), the display apparatus 100 changes the first UI to a second UI and displays the second UI (S940).

Meanwhile, the components of the display apparatus 100 described above may be implemented by software. For example, although not illustrated in FIG. 1, the display apparatus 100 may further include a flash memory or other non-volatile memories. The above-mentioned non-volatile memories may store programs corresponding to the respective components.

In addition, the controlling unit 130 may be implemented in a form including a central processing unit (CPU: not illustrated) and a random access memory (RAM). The CPU of the controlling unit 130 may copy the programs described above stored in the non-volatile memory into the RAM and then execute the copied program to automatically provide target information as described above.

Meanwhile, the displaying method of the display apparatus according to the various exemplary embodiments described above may be coded with software and may be stored in a non-transitory readable medium. The non-transitory readable medium described above may be mounted in various apparatuses to be used.

The non-transitory readable medium does not mean a medium storing data for a short period such as a register, a cashe, a memory, or the like, but means a machine-readable medium semi-permanently storing the data. Specifically, the non-transitory readable medium may be CD, DVD, a hard disc, Blu-ray disc, USB, a memory card, ROM, and the like.

According to the exemplary embodiments, the display method of the display apparatus may allow the user to use the user interface which is easy and simple and freely moves between contents or categories classifying the contents.

Hereinabove, although the exemplary embodiments have been shown and described, it should be understood that the present invention is not limited to the disclosed embodiments and may be variously changed by those skilled in the art without departing from the spirit and the scope of the embodiments. Therefore, the embodiments should be construed as including all the changes, equivalents, and substitutions included in the spirit and scope of the embodiments.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A display apparatus, comprising:
a display; and
a processor configured to:
control the display to display a content;
in response to detecting a first user input having a first pressure while the content is displayed, control the display to display a first UI (user interface) on a first region of the display, and
in response to detecting a second user input for selecting the first UI, having a second pressure while the first UI and the content are displayed, control the display to display a second UI on a second region of the display in a state in which the first UI is displayed on the first region,
wherein the second pressure is larger than the first pressure,
wherein the first UI comprises a first plurality of icons associated with functions of the display apparatus,
wherein the second UI comprises a second plurality of icons associated with an icon selected by the second user input among the first plurality of icons.

2. The display apparatus as claimed in claim 1, wherein the first UI further comprises a UI representing information on the contents displayed, and the second UI further comprises a UI including a plurality of menus associated with the contents displayed.

3. The display apparatus as claimed in claim 2, wherein the processor controls the display to display a highlight indicating an icon of the second plurality of icons included in the second UI,
wherein the highlight is moved to correspond to a direction of a third user input.

4. The display apparatus as claimed in claim 1, wherein the first UI further comprises a third plurality of icons associated with the content displayed, and the second UI further comprises more icons than the third plurality of icons included in the first UI by extending the first UI.

5. The display apparatus as claimed in claim 1, wherein the processor controls the display to display the second UI and the second plurality of icons of the second UI being enlarged in response to a third user input having larger pressure than the second user input being input, while the second UI is displayed.

6. The display apparatus as claimed in claim 1, wherein the display apparatus further comprises a pointing device,
wherein the processor controls the display to display a highlight indicating an icon of the second plurality of icons included in the second UI and performs a function corresponding to the icon on which the highlight is positioned when the highlight is not moved for more than a threshold time, and
wherein the highlight is moved along a motion of the pointing device.

7. The display apparatus as claimed in claim 1, wherein the display apparatus further comprises a pointing device,
wherein the processor controls the display to display the second UI on left and right edges of the display, and controls the display to display an icon corresponding to a position of the pointing device from among the second plurality of icons being enlarged.

8. The display apparatus as claimed in claim 1, wherein the display apparatus further comprises a pointing device,
wherein the processor controls the display to display a search box for a search instruction and a letter UI in response to the search instruction being input and to display a pointer corresponding to a position of the pointing device, and controls a movement speed of the pointer to become slow while the pointer passes over the letter UI.

9. The display apparatus as claimed in claim 8, wherein the processor controls the display to display a search result in a form of one of the first UI and the second UI in response to a search word being input through the search box and the letter UI.

10. A displaying method of a display apparatus, the displaying method comprising:
displaying a content;
displaying a first user interface (UI) on a first region of a display of the display apparatus in response to detecting a first user input having a first pressure while the contents are displayed; and
displaying a second UI on a second region of the display in a state in which the first UI is displayed on the first region, in response to detecting a second user input for selecting the first UI, having a second pressure while the first UI and the content are displayed on the first region,
wherein the second pressure is larger than the first pressure,
wherein the first UI comprises a first plurality of icons associated with functions of the display apparatus,
wherein the second UI comprises a second plurality of icons associated with an icon selected by the second user input among the first plurality of icons.

11. The displaying method as claimed in claim 10, wherein the first UI further comprises a UI representing information on the contents displayed, and the second UI further comprises a UI including a plurality of menus associated with the contents displayed.

12. The displaying method as claimed in claim 11, further comprising:
displaying a highlight indicating an icon of the second plurality of icons included in the second UI, and
wherein the highlight is moved to correspond to a direction of a third input direction.

13. The displaying method as claimed in claim 10, wherein the first UI further comprises a third plurality of icons associated with the content displayed, and
the second UI further comprises more icons than the third plurality of icons included in the first UI by extending the first UI.

14. The displaying method as claimed in claim 10, further comprising:
displaying the second UI and the second plurality of icons of the second UI being enlarged in response to a third user input having larger pressure than the second user input being input while the second UI is displayed.

15. The displaying method as claimed in claim 10, further comprising:
displaying a highlight indicating an icon of the second plurality of icons included in the second UI; and performing a function corresponding to the icon on which the highlight is positioned in response to the highlight being not moved for more than a threshold time, wherein the highlight is moved along a motion of a pointing device.

16. The displaying method as claimed in claim 10, further comprising:

displaying the second UI on left and right edges of the display; and display an icon corresponding to a position of a pointing device from among the second plurality of icons being enlarged.

17. The displaying method as claimed in claim 10, further comprising:

receiving a search instruction;

displaying a search box for the search instruction, a letter UI and a pointer corresponding to a position of a pointing device, in response to the search instruction being input; and controlling a movement speed of the pointer to become slow while the pointer passes over the letter UI.

18. The displaying method as claimed in claim 17, further comprising:

displaying a search result in a form of one of the first UI and the second UI in response to a search word being input through the search box and the letter UI.

19. A non-transitory recording medium storing a program code of a method to perform a displaying method in a display apparatus, the method comprising:

displaying content;

displaying a first user interface (UI) on a first region of a display of the display apparatus in response to detecting a first user input having a first while the contents are displayed; and displayinq a second UI on a second region of the display in a state in which the first UI is displayed on the first region, in response to detecting a second user input for selecting the first UI, having a second pressure while the first UI and the content are displayed on the first region, wherein the second pressure is larger than the first pressure, wherein the first UI comprises a first plurality of icons associated with functions of the display apparatus, wherein the second UI comprises a second plurality of icons associated with an icon selected by the second user input among the first plurality of icons.

* * * * *